Patented July 11, 1950

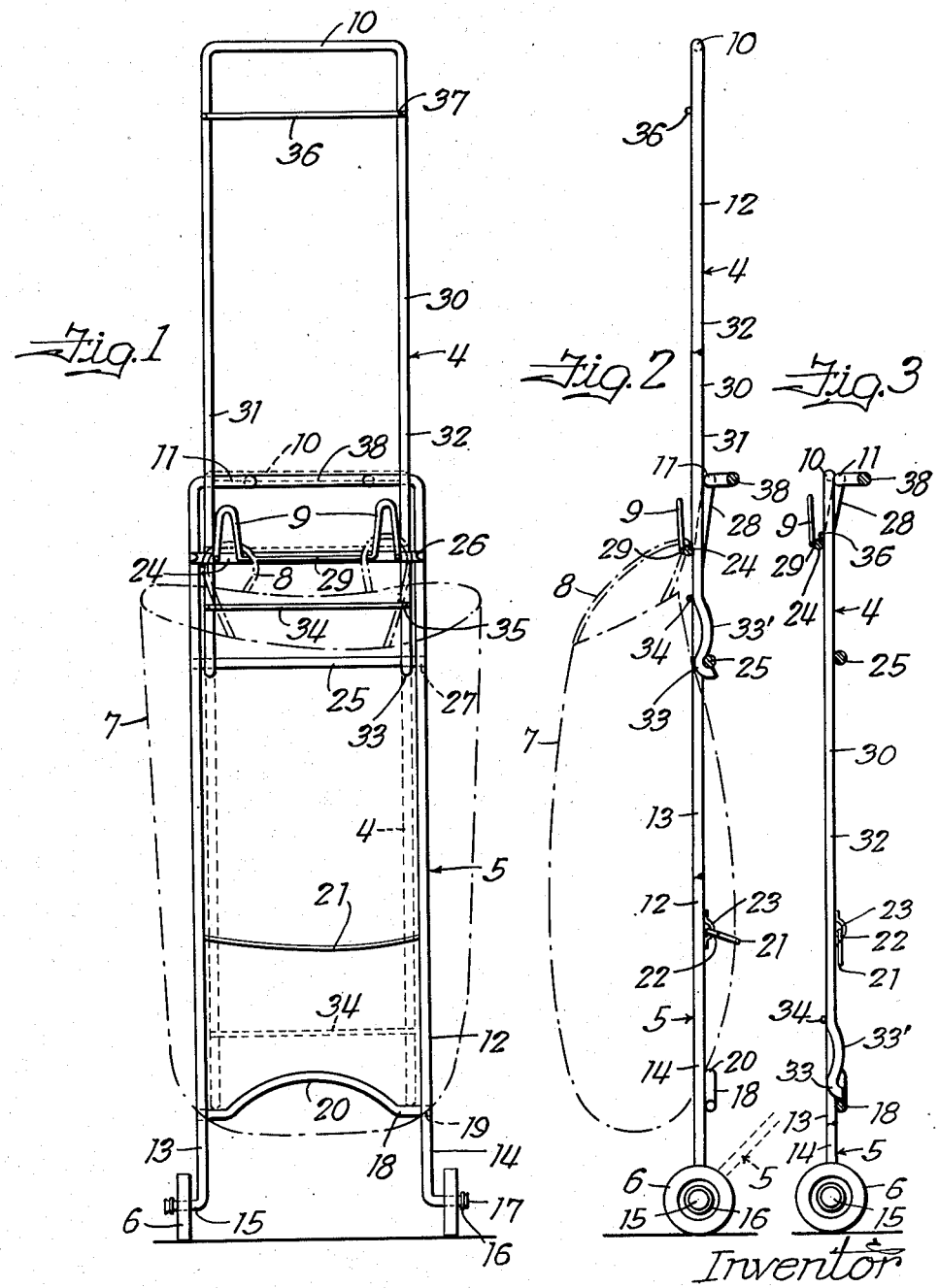

2,514,849

UNITED STATES PATENT OFFICE 2,514,849

SHOPPING BAG CARRIER CART

Francis W. Dewing, Rockford, Ill.

Application April 1, 1946, Serial No. 658,681

17 Claims. (Cl. 280—34)

This invention relates to a new and improved shopping bag carrier cart.

The principal object of my invention is to provide a cart of wire construction for lightness as well as economy, the same being quickly and easily extensible for use and as quickly and easily contractable for easy carrying and so that it is not awkward to handle in getting on and off street cars or buses.

Still another object is to provide a carrier cart, all parts of which are compacted substantially into a single plane, thus enabling the cart to be laid flat on the seat or floor of an automobile and to be carried with the shopping bag without too much added bulk, the flat design, however, affording adequate support for a loaded shopping bag when the cart is pulled along behind the operator at an angle of about 45°, the extended handle section under such conditions giving good leverage so that even the most heavily loaded shopping bag can be trundled along in this way with very little effort, most of the weight being concentrated near the wheels on the lower wheeled section of the cart.

The invention is illustrated in the accompanying drawing, in which:

Fig. 1 is a front view of a carrier cart made in accordance with my invention, the same being shown extended for use and a shopping bag being indicated in dotted lines suspended thereon;

Fig. 2 is a view partly in side elevation and partly in vertical section of the carrier cart shown in Fig. 1, and Fig. 3 is a vertical section through the cart in collapsed form.

The same reference numerals are applied to corresponding parts throughout these views.

The cart comprises an upper handle section 4 and a lower section 5 on which wheels 6 are provided to roll along the floor or sidewalk, the lower section 5 being designed to have a shopping bag 7 suspended by means of its handles 8 on hooks 9. In this way, the weight of the loaded bag is carried down as close to the wheels 6 as possible, thus affording the maximum leverage at the handle 10 and accordingly making it easier for the load to be trundled along with the cart at an angle of approximately 45° to the floor or sidewalk, such position being indicated in dotted lines in the lower portion of Fig. 2. The handle section 4 is extensible from the dotted line position shown in Fig. 1 to the full line position so that when the cart is collapsed for carrying to the store, it is no longer than the lower section 5, the handle 10 being brought down to the level of the top cross-portion 11 of the lower section, making it an easy matter to carry the cart with the empty shopping bag. This is particularly important where the shopper finds it necessary to get on and off buses or street cars in shopping. In fact, the cart, being of such light weight construction, will be found to add so little to the weight of a loaded shopping bag that it is not at all awkward to handle and carry the cart with the bag on street cars and buses. The flat design of the cart is also found to be an important advantage when the cart has to be carried, particularly through crowds on buses and street cars, and also from the standpoint that it takes up so little room when laid on the seat or on the floor of an automobile.

The lower section 5 comprises an inverted U-shaped wire frame 12, the cross-portion 11 of which, previously mentioned, connects the upper ends of the parallel arms or legs 13 and 14. The lower ends of the legs are bent outwardly to form axles 15 for the wheels 6. Washers 16 are placed over the projecting portions of the axles 15 and are retained in place by the upsetting or swedging of these ends, as indicated at 17. A lower cross-piece 18 of wire is welded at its ends 19 to the back of the legs 13 and 14 and has an upwardly arched middle portion 20 against which the back of the lower end portion of the shopping bag 7 is adapted to rest. The cross-piece 18, being so close to the lower ends of the legs 13 and 14, gives the desired rigidity to the frame 12. The frame is substantially narrower than the shopping bag as clearly appears in Fig. 1 so that the legs 13 and 14 afford support for the bag nearly the full length thereof, the cross-piece 18 serving to help support the bag and prevent its crowding between the legs 13 and 14. An auxiliary sling type of support for the bag may be provided by a swingable arched bail 21 of wire having looped ends 22 freely movable on eyelets 23 that are welded or otherwise suitably secured to the back of the legs 13 and 14 of the frame 12 at points spaced upwardly from the ends 19 of the cross-piece 18. This bail 21 assumes the position shown in Fig. 2 projecting rearwardly from the frame 12 around the back of the shopping bag 7 intermediate the upper and lower ends thereof to form a sling for support of the bag and limit the extent to which it will protrude between the legs 13 and 14 of the frame 12, thus positively preventing the bag from eventually working its way down through between the legs 13 and 14 and hanging on the wrong side of the frame 12 as the cart is being trundled along at the 45° angle to the floor or sidewalk indicated in dotted lines in Fig. 2. There are two other cross-pieces 24 and 25 of wire, the piece 24 being welded by its ends 26 onto the front of the legs 13 and 14, and the piece 25 being welded by its ends 27 onto the back of said legs, these pieces being in spaced parallel relation to one another and to the cross-portion 11. The upper end portions 28 of the legs 13 and 14 are bent rearwardly to support the cross-portion 11 in the same vertical plane with the cross-piece 25 on the back face of the frame. This is important because it leaves a space between the front and back faces of the frame 12, equivalent in other words to the thickness of the frame, in which the handle section 4 is housed and is movable up and down in the manner described. The cross-piece 24 has a piece of wire 29 welded thereon which has U-bends in the opposite end portion thereof to provide the hooks 9 previously mentioned.

The handle section 4 comprises a wire frame 30 of inverted U-shape, the cross-portion 10 of which forms the handle previously mentioned, connecting the upper ends of the two legs 31 and 32. This frame 30 is slightly narrower than the frame 12 so as to fit between the legs 13 and 14 and permit telescoping the sections 4 and 5, as illustrated in Fig. 3 and as indicated in dotted lines in Fig. 1. The lower ends of the legs 31 and 32 are hook-shaped, as indicated at 33 in Fig. 2, and just above the hook-shaped ends 33 are arched rearwardly, as indicated at 33' in Fig. 2, so as to provide a resilient interlocking action between the parts when the hooked ends 33 ride onto the cross-piece 25, there being sufficient spring in the wire frame 30 so that the hooks 33 are spring-pressed into engagement with the cross-piece 25. It is, furthermore, apparent that when the sections 4 and 5 are extended for carrying the loaded shopping bag, the weight imposed upon the cart further helps to keep the hooks 33 securely engaged on the cross-piece 25, because the force then acting on the section 4 is in that direction. A cross-piece 34 of wire is welded at its ends 35 to the front of the legs 31 and 32 near the hooked lower ends 33 to maintain these legs in the proper spaced relationship and lend rigidity to the frame 30. Another cross-piece 36 of wire is welded at its ends 37 onto the front of the legs 30 and 31 near the upper ends thereof and serves by engagement on top of the cross-piece 24 when the sections 4 and 5 are telescoped, as shown in Fig. 3, to limit the downward movement of the section 4 relative to section 5. The middle portion 38 of the cross-portion 11 of the frame 12 is preferably bent into offset parallel relation to the rest of the cross-portion to provide a hand grip portion which the operator may take hold of when collapsing the frame of the cart so as to eliminate the danger of pinching the fingers between the two sections 4 and 5 in this operation.

There is sufficient frictional drag upon the movement of section 4 relative to section 5, by reason of the sliding engagements at 11, 24 and 25, to eliminate any likelihood of the sections moving relative to one another when the cart frame is collapsed, as illustrated in Fig. 3. The operator can quickly and easily extend the frame of the cart by pulling upwardly on the handle 10 while holding section 5 down by bearing one foot on top of the cross-piece 18. The section 4 is pulled outwardly until the hooked ends 33 snap into place on the cross-piece 25. The operator can easily perform this operation in a second. Later, when it is desired to collapse the frame of the cart again, the lower end of section 5 is braced against any convenient abutment or held between the two feet and the handle 10 is given a sharp blow with the fist sufficient to release the hooked ends 33 from the cross-piece 25, after which the section 4 can be slid downwardly to the point where the cross-piece 36 engages the cross-piece 24, as shown in Fig. 3. The section 4 slides between the cross-pieces 24 and 25 and cross-portion 11 of the frame 12 with just enough frictional drag to eliminate looseness, and yet the frictional drag is not enough to interfere with a woman shopper opening and closing the frame of the cart with comparative ease.

It is believed the foregoing description conveys a good understanding of the objects and advantages of my invention. The appended claims have been drawn to cover all legitimate modifications and adaptations.

I claim:

1. A device of the class described comprising an inverted U-shaped wire frame, wheels mounted on said frame for rolling support of the device on a floor or sidewalk, carrier means on said frame for carrying a load, a wire handle bent to inverted U-shape providing arms joined by a cross-portion, the cross-portion forming a handle grip portion, means slidably guiding the arms of said handle on the frame so that the handle is extensible from a retracted position substantially within the area of the frame to an operative position in substantially coplanar coextensive relationship to the frame, and means for detachably securing the parts in the latter relationship, the last mentioned means comprising hook-shaped end portions bent from said wire arms and arched portions bent outwardly from said arms above said hooks, and abutments on said frame over which said arched portions are slidable so as to spring said arms and on which the hooks are lockingly engageable upon return of the spring arms.

2. A device of the class described comprising an inverted U-shaped wire frame, wheels mounted on said frame for rolling support of the device on a floor or sidewalk, carrier means on said frame for carrying a load, a wire handle bent to inverted U-shape providing arms joined by a cross-portion, the cross-portion forming a handle grip portion, means slidably guiding the arms of said handle on the frame so that the handle is extensible from a retracted position substantially within the area of the frame to an operative position in substantially coplanar coextensive relationship to the frame, and means for detachably securing the parts in the latter relationship, the last mentioned means comprising hook-shaped end portions bent from said wire arms and arched portions bent outwardly from said arms above said hooks, and a cross-member on said frame providing abutments at its opposite end portions over which said arched portions are slidable so as to spring said arms and on which the hooks are lockingly engageable upon return of the spring arms.

3. A device of the class described comprising an inverted U-shaped wire frame, wheels mounted on the lower end of said frame for rolling support of the device on a floor or sidewalk, spaced cross-members applied to the opposite faces of said frame near the upper end thereof to define a guideway therebetween, a handle slidable in said guideway and extensible to an operative position from a retracted position, and hooks on one of said cross-members on which the handles of a shopping bag are attached for suspension of the bag so that a load in the bag is carried on said frame close to the wheels on the lower end.

4. A device of the class described comprising an inverted U-shaped wire frame, wheels mounted on the lower end of said frame for rolling support of the device on a floor or sidewalk, spaced cross-members applied to the opposite faces of said frame near the upper end thereof to define a guideway therebetween, and a wire handle bent to inverted U-shape providing arms joined by a cross-portion, the latter forming a handle grip portion, the arms being slidable in the aforesaid guideway so that the handle is extensible to operative position from a retracted position, the lower ends of said arms being bent to form hooks for detachable locking engagement on one of said cross-members in the extended position.

5. A device of the class described comprising an inverted U-shaped wire frame, wheels mounted on the lower end of said frame for rolling support of the device on a floor or sidewalk, spaced cross-members applied to the opposite faces of said frame near the upper end thereof to define a guide way therebetween, a wire handle bent to inverted U-shape providing arms joined by a cross-portion, the latter forming a handle grip portion, the arms being slidable in the aforesaid guideway so that the handle is extensible to operative position from a retracted position, and means for detachably securing the handle to the frame in extended position.

6. A device of the class described comprising an inverted U-shaped wire frame, wheels mounted on said frame for rolling support of the device on a floor or sidewalk, a wire handle bent to inverted U-shape providing arms joined by a cross-portion, the cross-portion forming a handle grip portion, means slidably guiding the arms of said handle on the frame so that the handle is extensible from a retracted position substantially within the area of the frame to an operative position in substantially coplanar coextensive relation to the frame, hooks on the upper end portion of said frame on which the handles of a shopping bag are attachable to suspend the bag on the frame, and a sling member disposed crosswise of said frame intermediate its end swingable outwardly from the plane of the frame for support of the bag from behind.

7. A device of the class described comprising an inverted U-shaped wire frame, wheels mounted on said frame for rolling support of the device on a floor or sidewalk, a wire handle bent to inverted U-shape providing arms joined by a cross-portion, the cross-portion forming a handle grip portion, and means slidably guiding the arms of said handle on the frame so that the handle is extensible from a retracted position substantially within the area of the frame to an operative position in substantially coplanar coextensive relationship to the frame, the cross-portion of said frame having an intermediate portion of the length thereof bent into rearwardly offset substantially parallel relationship to the rest of the cross-portion to form a safety hand grip portion.

8. A device of the class described comprising an inverted U-shaped wire frame, wheels mounted on said frame for rolling support of the device on a floor or sidewalk, a wire handle bent to inverted U-shape providing arms joined by a cross-portion, the cross-portion forming a handle grip portion, means slidably guiding the arms of said handle on the frame so that the handle is extensible from a retracted position substantially within the area of the frame to an operative position in substantially coplanar coextensive relation to the frame, and an abutment on the upper end portion of said handle for engagement with an abutment on said frame near its upper end to limit retracting movement of said handle.

9. A device of the class described comprising an inverted U-shaped wire frame, wheels mounted on said frame for rolling support of the device on a floor or sidewalk, carrier means on said frame for carrying a load, a wire handle bent to inverted U-shape providing arms joined by a cross-portion, the cross-portion forming a handle grip portion, and means slidably guiding the arms of said handle on the frame so that the handle is extensible from a retracted position substantially within the area of the frame to an operative position in substantially coplanar coextensive relationship to the frame, said frame being substantially narrower than the shopping bag carried thereon so that the arms form supports for the bag substantially throughout the length thereof and said arms being connected by at least one cross-member intermediate the ends thereof for rigidification of the frame and for the support of the bag by contact with the back thereof, the carrier means comprising hooks on the upper end portion of said frame on which the handles of the shopping bag are attached for suspension of the bag on the front of the frame.

10. A device of the class described comprising an inverted U-shaped wire frame, wheels mounted on said frame for rolling support of the device on a floor or sidewalk, a wire handle bent to inverted U-shape providing arms joined by a cross-portion, the cross-portion forming a handle grip portion, and means slidably guiding the arms of said handle on the frame so that the handle is extensible from a retracted position substantially within the area of the frame to an operative position in substantially coplanar coextensive relationship to the frame, the upper end portion of the arms of said frame being bent rearwardly to offset the cross-portion of the frame into the plane of the back face of the frame, the means for guiding the handle on said frame including said cross-portion and two cross-members in spaced substantially parallel relation to the cross-portion, the upper one of which is secured to the frame in the plane of the front face and the lower one of which is secured to the frame in the plane of the rear face.

11. A device of the class described comprising an inverted U-shaped wire frame, wheels mounted on said frame for rolling support of the device on a floor or sidewalk, a wire handle bent to inverted U-shape providing arms joined by a cross-portion, the cross-portion forming a handle grip portion, and means slidably guiding the arms of said handle on the frame so that the handle is extensible from a retracted position substantially within the area of the frame to an operative position in substantially coplanar coextensive relationship to the frame, the upper end portion of the arms of said frame being bent rearwardly to offset the cross-portion of the frame into the plane of the back face of the frame, the means for guiding the handle on said frame including said cross-portion and two cross-members in spaced substantially parallel relation to the cross-portion, the upper one of which is secured to the frame in the plane of the front face and the lower one of which is secured to the frame in the plane of the rear face, the cross-portion having an intermediate portion of the length thereof bent into rearwardly offset substantially parallel relation to the rest of the cross-portion to form a safety hand grip.

12. A carrier cart for use in shopping to facilitate the carrying of a parcel filled shopping bag comprising an inverted U-shaped wire frame, wheels mounted on the lower end of said frame for rolling support of the cart, the cross-portion on the upper end of said frame forming a handle grip portion, laterally spaced hooks on the upper end portion of said frame on which the handle loops on the shopping bag may be engaged for suspension of the bag on said frame, abutment means for the bag between the arms of said frame below said hooks, and an inverted U-shaped wire handle, the cross-portion of which forms a second handle grip portion, and means slidably guiding the arms of said handle on the aforesaid frame so that the handle is extensible from a retracted position substantially within the area of the frame to an operative position in substantially coplanar coextensive relationship to the frame, said means comprising vertically spaced cross-members on the upper end portion of the aforesaid frame secured to the front and back faces of said frame, the cross-portion on the upper end of said frame which forms the handle grip portion being offset from the plane of said frame substantially into the plane of the one face of said frame in coplanar relation to one of said cross-members.

13. A carrier cart for use in shopping to facilitate the carrying of a parcel filled shopping bag comprising an inverted U-shaped wire frame, wheels mounted on the lower end of said frame for rolling support of the cart, the cross-portion on the upper end of said frame forming a handle grip portion, laterally spaced hooks on the upper end portion of said frame on which the handle loops on the shopping bag may be engaged for suspension of the bag on said frame, abutment means for the bag between the arms of said frame below said hooks, and an inverted U-shaped wire handle, the cross-portion of which forms a second handle grip portion, and means slidably guiding the arms of said handle on the aforesaid frame so that the handle is extensible from a retracted position substantially within the area of the frame to an operative position in substantially coplanar coextensive relationship to the frame, the lower ends of the arms of said wire handle being bent to form projections, and there being cross-members on said wire frame in vertically spaced relation arranged to be engaged by said projections at the upper and lower limits of movement of said handle.

14. A carrier cart for use in shopping to facilitate the carrying of a parcel filled shopping bag comprising a generally rectangular wire frame having wheels mounted on the lower end for rolling support of the cart and the cross portion on the upper end forming a handle grip portion, a cross-member on the upper end portion of said frame spaced slightly below the handle grip portion and carrying hooks on which the handle loops on the shopping bag may be engaged for suspension of the bag on said frame, abutment means for the bag between the side portions of said frame below the cross-member carrying said hooks, said frame being only slightly longer in overall length than the shopping bag which it is designed to carry, and an extensible and retractable handle on said frame to facilitate rolling the cart in an inclined position, the overall length of the cart with handle extended being approximately twice the length of the shopping bag, the weight of which is concentrated on the lower half of the extended cart, namely, the frame part, making for an appreciable mechanical advantage in the matter of carrying a shopping bag when it is heavily loaded.

15. A carrier cart as set forth in claim 14, wherein said wire frame is substantially narrower than the shopping bag carried thereon, so that the arms form supports for the bag substantially throughout the length thereof, said arms being connected by at least one cross-member intermediate the ends thereof for rigidification of the frame and for the support of the bag by contact with the back thereof, the bag being suspended on the front of the frame.

16. A carrier cart as set forth in claim 14, wherein said wire frame is substantially narrower than the shopping bag carried thereon, so that the arms form supports for the bag substantially throughout the length thereof, said arms being connected by at least one cross-member intermediate the ends thereof for rigidification of the frame and for the support of the bag by contact with the back thereof, the bag being suspended on the front of the frame, the cart also including a sling member disposed crosswise of said frame between the last mentioned cross-member and the first mentioned cross-member, the sling member being swingable outwardly from the plane of the frame for support of the bag from behind.

17. A carrier cart as set forth in claim 14, wherein said wire frame is substantially narrower than the shopping bag carried thereon, so that the arms form supports for the bag substantially throughout the length thereof, said arms being connected by at least one cross-member intermediate the ends thereof for rigidification of the frame and for the support of the bag by contact with the back thereof, the bag being suspended on the front of the frame, the lower ends of the arms of said frame being bent outwardly to provide axle portions on which the wheels for rolling support of the cart are mounted to increase the spacing of the wheels beyond the width of the frame.

FRANCIS W. DEWING.

REFERENCES CITED

The following references are of record in the file of this patent:

UNITED STATES PATENTS

| Number | Name | Date |
| --- | --- | --- |
| 887,858 | Smith | May 19, 1908 |
| 1,635,423 | Lapham | July 12, 1927 |
| 2,249,123 | Fleck | July 15, 1941 |

FOREIGN PATENTS

| Number | Country | Date |
| --- | --- | --- |
| 191,534 | Germany | Oct. 10, 1907 |
| 521,415 | Germany | Nov. 3, 1929 |
| 777,422 | France | Nov. 26, 1934 |